US011990939B2

(12) United States Patent
Zhu et al.

(10) Patent No.: US 11,990,939 B2
(45) Date of Patent: May 21, 2024

(54) OPTICAL MODULE

(71) Applicant: Accelink Technologies Co., Ltd., Wuhan (CN)

(72) Inventors: Hu Zhu, Wuhan (CN); Liping Sun, Wuhan (CN); Yongan Fu, Wuhan (CN); Yong Luo, Wuhan (CN); Qianggao Hu, Wuhan (CN)

(73) Assignee: Accelink Technologies Co., Ltd., Wuhan (CN)

( * ) Notice: Subject to any disclaimer, the term of this patent is extended or adjusted under 35 U.S.C. 154(b) by 187 days.

(21) Appl. No.: 17/629,878

(22) PCT Filed: Dec. 5, 2019

(86) PCT No.: PCT/CN2019/123415
§ 371 (c)(1),
(2) Date: Jan. 25, 2022

(87) PCT Pub. No.: WO2021/056825
PCT Pub. Date: Apr. 1, 2021

(65) Prior Publication Data
US 2022/0294531 A1 Sep. 15, 2022

(30) Foreign Application Priority Data
Sep. 26, 2019 (CN) .......................... 201910915421.X

(51) Int. Cl.
*H04B 10/25* (2013.01)
*H04B 10/40* (2013.01)
(52) U.S. Cl.
CPC ....... *H04B 10/25891* (2020.05); *H04B 10/40* (2013.01)

(58) Field of Classification Search
CPC .............. H04B 10/25891; H04B 10/40; H04B 10/506; H04B 10/503; H04B 10/60; H04J 14/0202
(Continued)

(56) References Cited

U.S. PATENT DOCUMENTS

| 6,624,938 | B1 * | 9/2003 | Ye | G02B 27/283 |
| | | | | 385/11 |
| 7,534,054 | B2 * | 5/2009 | Hudgins | H04B 10/075 |
| | | | | 714/45 |

(Continued)

FOREIGN PATENT DOCUMENTS

| CN | 201252549 Y | 6/2009 |
| CN | 201252549 Y * | 6/2009 |

(Continued)

OTHER PUBLICATIONS

International Search Report for PCT/CN2019/123415 dated Jun. 28, 2020. 4 pgs.

(Continued)

*Primary Examiner* — Abbas H Alagheband
(74) *Attorney, Agent, or Firm* — Lei Fang, Esq.; Smith Tempel Blaha LLC

(57) ABSTRACT

Disclosed are an optical module, an optical communication device and an optical transmission system. The optical module includes a housing; a main board where are arrange a first transmitting unit and a first receiving unit; a first optical circulator, a first port of which is connected to an output end of the first transmitting unit, and a third port of which is connected to an input end of the first receiving unit; and a first optical fiber adapter connected to a second port of the first optical circulator, wherein an optical signal from the output end of the first transmitting unit is transmitted to the second port along the first port of the first optical circulator; and the first optical fiber adapter receives an optical signal (Continued)

input from outside, and transmits it to the third port along the second port of the first optical circulator.

15 Claims, 3 Drawing Sheets

(58) Field of Classification Search
    USPC ........................................................ 398/135
    See application file for complete search history.

(56) References Cited

U.S. PATENT DOCUMENTS

| | | | |
|---|---|---|---|
| 2005/0047795 | A1 | 3/2005 | Windover et al. |
| 2008/0031576 | A1* | 2/2008 | Hudgins ............. H04B 10/075 385/92 |
| 2008/0069570 | A1* | 3/2008 | Dallesasse ............. H04B 10/40 398/43 |
| 2008/0089691 | A1* | 4/2008 | Hudgins ............. H04B 10/075 398/117 |
| 2008/0095541 | A1* | 4/2008 | Dallesasse ............. H04B 10/40 398/191 |
| 2013/0148979 | A1* | 6/2013 | Hsiao .................... H04B 10/40 398/139 |
| 2016/0149283 | A1* | 5/2016 | Shen ......................... H01P 1/36 333/135 |

FOREIGN PATENT DOCUMENTS

| | | | | |
|---|---|---|---|---|
| CN | 201252550 | Y | 6/2009 | |
| CN | 201266937 | Y | 7/2009 | |
| CN | 102412893 | A | 4/2012 | |
| CN | 103338088 | A | 10/2013 | |
| CN | 104467974 | A  * | 3/2015 | |
| CN | 104467974 | A | 3/2015 | |
| CN | 206248889 | U | 6/2017 | |
| CN | 107688215 | A | 2/2018 | |
| CN | 207051530 | U | 2/2018 | |
| CN | 108333691 | A | 7/2018 | |
| CN | 109061811 | A | 12/2018 | |
| CN | 110768743 | B | 3/2021 | |
| CN | 114035285 | A  * | 2/2022 | ............... G02B 6/42 |
| JP | 2005080292 | A | 3/2005 | |
| WO | 2014049342 | A1 | 4/2014 | |

OTHER PUBLICATIONS

Search Report for Chinese Application No. CN201910915421.X dated Dec. 22, 2020. 2 pgs.

Search Report for Chinese Application No. CN201910915421.X dated May 13, 2020. 2 pgs.

* cited by examiner

OPTICAL MODULE

CROSS-REFERENCE TO RELATED APPLICATIONS

The present application is a U.S. national entry under 35 U.S.C. § 371 of International Application No. PCT/CN2019/123415, filed Dec. 5, 2019, which claims the benefit of Chinese patent application No. 201910915421.X, filed Sep. 26, 2019, the disclosures are hereby incorporated herein by reference.

TECHNICAL FIELD OF THE DISCLOSURE

The present disclosure relates to optical communication technologies, in particular to an optical module.

BACKGROUND

In the existing data center, optical modules generally adopt dual-fiber bidirectional packaging, that is, the transmitting end and the receiving end are independent on the optical path, and each of them requires an optical fiber to interconnect with the outside world. One optical module shall be connected to the outside world via two optical fibers, which causes great waste of optical fiber resources, especially in the ultra-large data center, where the workload of optical fiber cabling and maintenance is extremely high. Data center optical modules generally have at least 4 transmitters and 4 receivers, and some 400 G optical modules, such as 2×200 G Coarse Wavelength Division Multiplexing (CWDM) 4 optical modules, even comprise 8 transmitters and 8 receivers. Here, Transmitting and receiving work in the same waveband, and the optical module packaging density is very high, which results in great challenges to the single-fiber multi-directional design.

Therefore, how to realize a multi-channel single-fiber multi-directional optical module with a low-cost, high-reliability is a problem that needs to be solved at present.

SUMMARY

An embodiment of the present application provides an optical module comprising a housing, a main board, a first optical circulator, and a first optical fiber adapter, wherein the housing is surrounded by a receiving cavity, and a first end of the housing is provided with a first connecting cavity;

the first optical fiber adapter is arranged at the first connecting cavity;

the main board is at least partially arranged in the receiving cavity;

the main board is provided with a first transmitting unit and a first receiving unit;

an output end of the first transmitting unit is connected to the first port of the first optical circulator, an input end of the first receiving unit is connected to a third port of the first optical circulator, and a second port of the first optical circulator is connected to the first optical fiber adapter;

an optical signal output by the output end of the first transmitting unit is transmitted along the first port of the first optical circulator to the second port of the first optical circulator; and the first optical fiber adapter receives an optical signal input from outside, and transmits the same to the third port of the first optical circulator along the second port of the first optical circulator.

In some embodiments, the first end of the housing is further provided with a second connecting cavity.

In some embodiments, the first port and the third port of the first optical circulator are located on a first side of the first optical circulator, and the second port of the first optical circulator is located on a second side of the first optical circulator.

In some embodiments, the first optical circulator is arranged on the main board.

In some embodiments, the optical module further comprises a second optical circulator and a second optical fiber adapter, wherein the second optical fiber adapter is arranged at the second connecting cavity;

the main board is further provided with a second transmitting unit and a second receiving unit;

an output end of the second transmitting unit is connected to a first port of the second optical circulator, an input end of the second receiving unit is connected to a third port of the second optical circulator, and a second port of the second optical circulator is connected to the second optical fiber adapter;

an optical signal output by the output end of the second transmitting unit is transmitted along the first port of the second optical circulator to the second port of the second optical circulator; and the second optical fiber adapter receives an optical signal input from outside, and transmits the same to the third port of the second optical circulator along the second port of the second optical circulator.

In some embodiments, the first port and the third port of the second optical circulator are located on a first side of the second optical circulator, and the second port of the second optical circulator is located on a second side of the second optical circulator.

In some embodiments, the second optical circulator is arranged on the main board.

In some embodiments, the first optical circulator, the second optical circulator, the first transmitting unit, and the second transmitting unit are located on one side of the main board;

the first receiving unit and the second receiving unit are located on the other side of the main board;

the first transmitting unit is located between the first optical circulator and the second optical circulator, close to the second optical circulator;

the first receiving unit is located close to the second optical circulator;

the second transmitting unit is located between the first optical circulator and the second optical circulator, close to the first optical circulator; and the second receiving unit is located close to the first optical circulator.

An embodiment of the present application provides an optical communication equipment comprising any optical module described above.

An embodiment of the present application provides an optical transmission system comprising the optical communication equipment described above.

In the embodiments of the present application, the output end of the first transmitting unit on the main board is connected to the first port of the first optical circulator, and the input end of the first receiving unit on the main board is connected to the third port of the first optical circulator, the second port of the first optical circulator is connected to the first optical fiber adapter, and the optical signal output by the output end of the first transmitting unit is transmitted to the second port of the first optical circulator along the first port of the first optical circulator; the first optical fiber adapter receives the optical signal, which is input from outside, and transmits the same to the third port of the first optical circulator along the second port of the first optical circulator, thereby realizing a single fiber bidirectional transmission optical module for realizing an optical transmission route of single fiber bidirectional transmission and reception through the first optical circulator with a low cost, simple optical path structure and improved equipment reliability.

BRIEF DESCRIPTION OF THE DRAWINGS

The accompanying drawings generally show the various embodiments discussed herein by way of example rather than limitation.

DETAILED DESCRIPTION

In order to have a more detailed understanding of the features and technical content of embodiments of the present application, the implementation of the embodiments of the present application will be described in detail below with reference to the accompanying drawings. The drawings are for reference and explanation only, and are not used to limit the embodiments of the present application.

It should be noted that the terms "first\ second\third" involved in the embodiments of the present application are only used for distinguishing similar objects, and do not represent a specific order for the objects. It can be understood that a specific order or rank of "first\ second\third" can be interchanged when permitted. It should be understood that the objects distinguished by "first\ second\third" can be interchanged under appropriate circumstances, such that the embodiments of the present application described herein can be implemented in a sequence other than those illustrated or described herein.

In the description of the embodiments of the present application, it should be noted that, unless otherwise specified and limited, the term "connection" should be understood in a broad sense. For example, it can be an electrical connection, or a connection between two components, it also can be a direct connection, in addition to indirect connection through an intermediary. For those of ordinary skill in the art, the specific meaning of the above terms can be understood according to specific circumstances.

The optical module described in the embodiment of the present application will be described in detail below in conjunction with FIG. 1 to FIG. 5.

Figure 1:
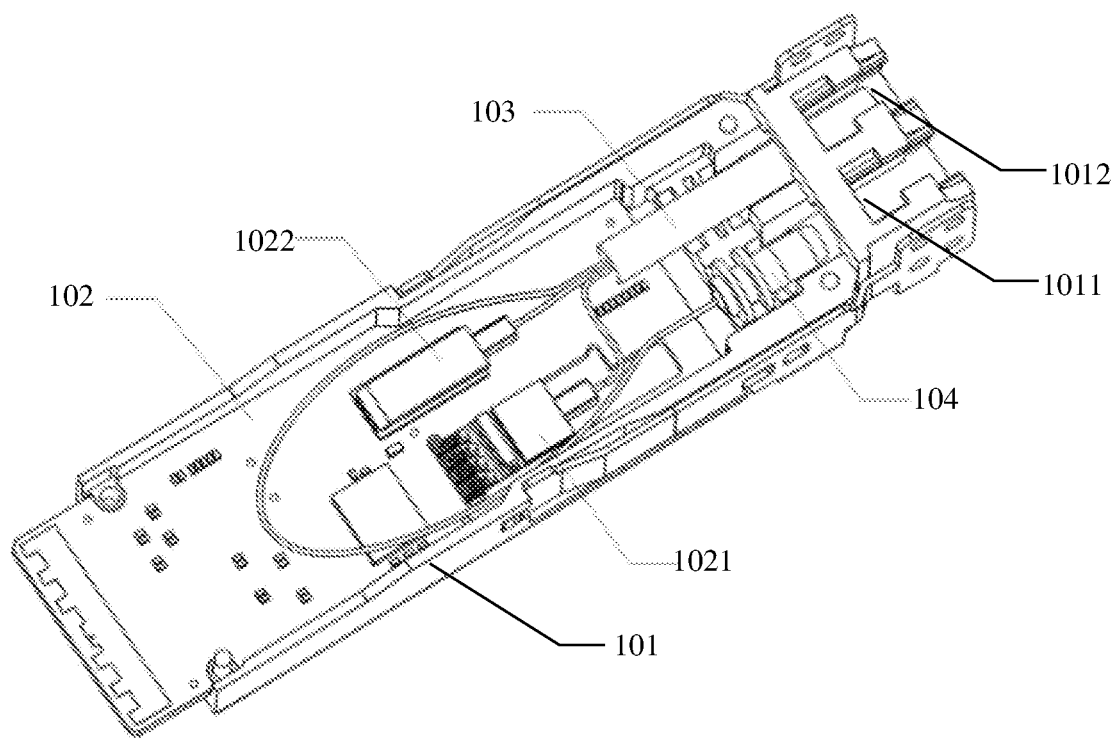
FIG. 1 is a schematic structural diagram of an optical module of an embodiment of the present application.

FIG. 1 is a schematic structural diagram of an optical module according to an embodiment of the application. As shown in FIG. 1, an embodiment of the present application provides an optical module comprising a housing 101, a main board 102, a first optical circulator 103 and a first fiber optic adapter 104.

The housing 101 is surrounded by a receiving cavity, and a first end of the housing 101 is provided with a first connecting cavity 1011.

The first fiber optic adapter 104 is arranged at the first connecting cavity 1011.

A first transmitting unit 1021 and a first receiving unit 1022 are arranged on the main board 102.

An output end of the first transmitting unit 1021 is connected to a first port of the first optical circulator 103, an input end of the first receiving unit 1022 is connected to a third port of the first optical circulator 103, and a second port of the first optical circulator 103 is connected to the first optical fiber adapter 104.

An optical signal output from the output end of the first transmitting unit 1021 is transmitted along the first port of the first optical circulator 103 to the second port of the first optical circulator 103. The first optical fiber adapter 104 receives an optical signal, which is input from outside, and transmits the same to the third port of the first optical circulator 103 along the second port of the first optical circulator 103.

In some embodiments, the first end of the housing 101 is further provided with a second connecting cavity 1012.

In some embodiments, the first port, the second port, and the third port of the first optical circulator 103 are located on a first side of the first optical circulator 103. In this arrangement, the optical circulator adopts a reflective optical path structure inside, which can reduce the size of the optical circulator. Three port fibers of the optical circulator are on the same side, and the coiling method of these fibers is thus different from that the first port and the third port are on the same side, and the second port is on the other side, thereby increasing the flexibility in the optical module coil layout.

In some embodiments, the first optical circulator 103 is arranged at the second connecting cavity 1012, and a second side of the first optical circulator 103 is at least partially located in the second connecting cavity 1012.

The first transmitting unit 1021 and the first receiving unit 1022 are located on the same plane of the main board 102. The three ports of the first optical circulator 103 are distributed on the same side. Since the optical module has two connecting cavities, and the first optical fiber adapter 104 occupies only one optical port, the other space where the optical fiber adapter was originally placed in the conventional optical module can be used to place the main body of the first optical circulator 103. The optical module layout shown in this embodiment can conveniently realize the single optical port input/output for the existing dual optical port 4×25 G CWDM4 optical module and 4×100 G FR4 optical module, which greatly saves optical fiber resources in the data center.

In some embodiments, the first port and the third port of the first optical circulator 103 are located on the first side of the first optical circulator 103, and the second port of the first optical circulator 103 is located on the second side of the first optical circulator 103.

In some embodiments, the three ports of the optical circulator may be distributed on the same side or on different sides, the selection of which may be made according to the fiber layout of the module.

In some embodiments, the first optical circulator 103 is arranged on the main board 102.

Figure 2:
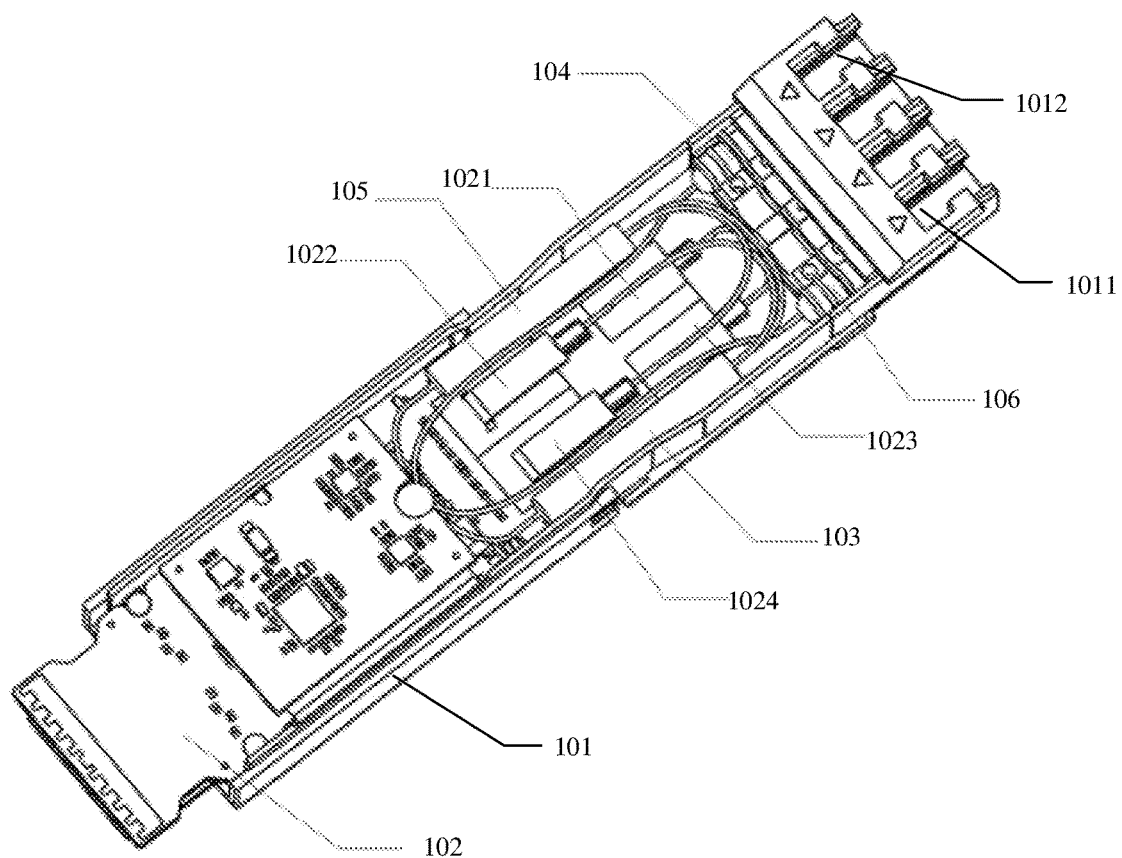
FIG. 2 is a schematic structural diagram of an optical module of another embodiment of the present application.
Figure 3:
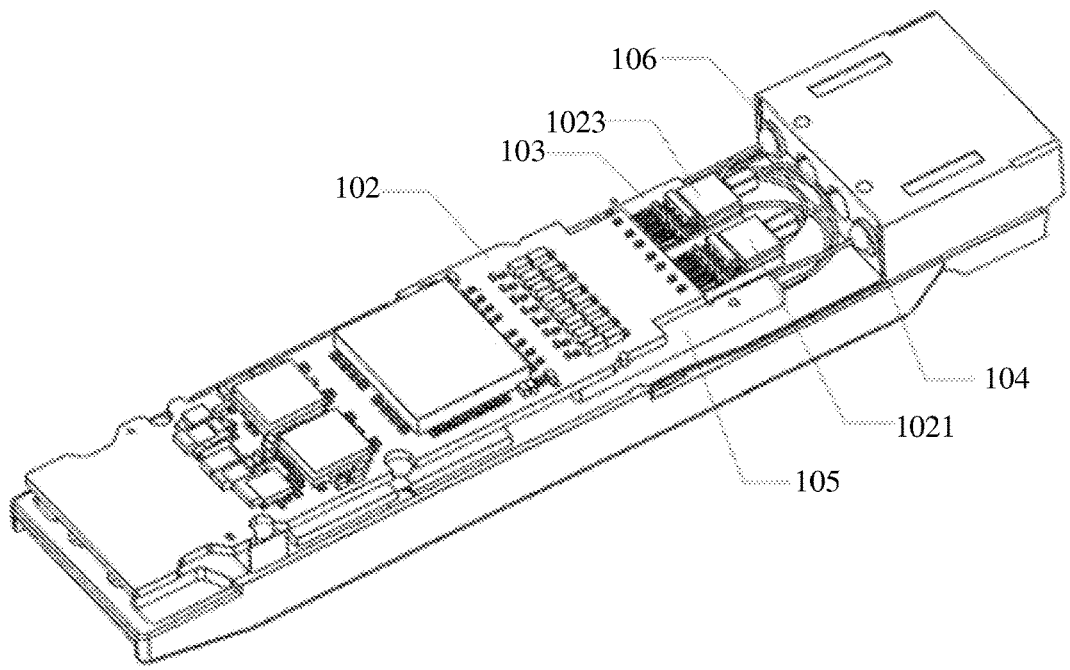
FIG. 3 is a schematic structural diagram of an optical module of another embodiment of the present application.

FIG. 2 is a schematic structural diagram of an optical module according to another embodiment of the application, and FIG. 3 is a schematic structural diagram of an optical module according to another embodiment of the application. As shown in FIGS. 2 and 3, in some embodiments, the optical module further comprises a second optical circulator 105 and a second optical fiber adapter 106.

The second fiber optic adapter 106 is arranged at the second connecting cavity 1012.

The main board 102 is further provided with a second transmitting unit 1023 and a second receiving unit 1024.

An output end of the second transmitting unit 1023 is connected to a first port of the second optical circulator 105. An input end of the second receiving unit 1024 is connected to a third port of the second optical circulator 105. A second port of the second optical circulator 105 is connected with the second optical fiber adapter 106.

An optical signal output from the output end of the second transmitting unit 1023 is transmitted along the first port of the second optical circulator 105 to the second port of the second optical circulator 105. The second optical fiber adapter 106 receives an optical signal, which is input from outside, and transmits the same to the third port of the second optical circulator 105 along the second port of the second optical circulator 105.

In some embodiments, the first port and the third port of the second optical circulator 105 are located on a first side of the second optical circulator 105, and the second port of the second optical circulator 105 is located on a second side of the second optical circulator 105.

In some embodiments, the second optical circulator 105 is arranged on the main board 102.

In some embodiments, as shown in FIG. 2, the first optical circulator 103, the second optical circulator 105, the first transmitting unit 1021, the first receiving unit 1022, the second transmitting unit 1023, and the second receiving unit 1024 are located at one side of the main board 102;

the first side of the first optical circulator 103 is close to the second optical fiber adapter 106;

the first side of the second optical circulator 105 is close to the first optical fiber adapter 104;

the first transmitting unit 1021 and the first receiving unit 1022 are located between the first optical circulator 103 and the second optical circulator 105, close to the second optical circulator 105; and the second transmitting unit 1023 and the second receiving unit 1024 are located between the first optical circulator 103 and the second optical circulator 105, close to the first optical circulator 103.

By adopting the layout of this embodiment of the present application, the risk that the connecting optical fiber between the optical transmission devices is easily broken because the positions of the optical transmission device are too close can be reduced.

In some embodiments, as shown in FIG. 3, the first optical circulator 103, the second optical circulator 105, the first emission unit 1021, and the second emission unit 1023 are located on one side of the main board 102;

the first receiving unit 1022 and the second receiving unit 1024 are located on the other side of the main board 102;

the first transmitting unit 1021 is located between the first optical circulator 103 and the second optical circulator 105, close to the second optical circulator 105;

the first receiving unit 1022 is located close to the second optical circulator 105;

the second transmitting unit 1023 is located between the first optical circulator 103 and the second optical circulator 105, close to the first optical circulator 103; and the second receiving unit 1024 is located close to the first optical circulator 103.

In practical applications, the layout of this embodiment of the present application improves flexibility to the fiber layout of the optical module and provides a variety of options for the internal structural design of the optical module.

Figure 4:
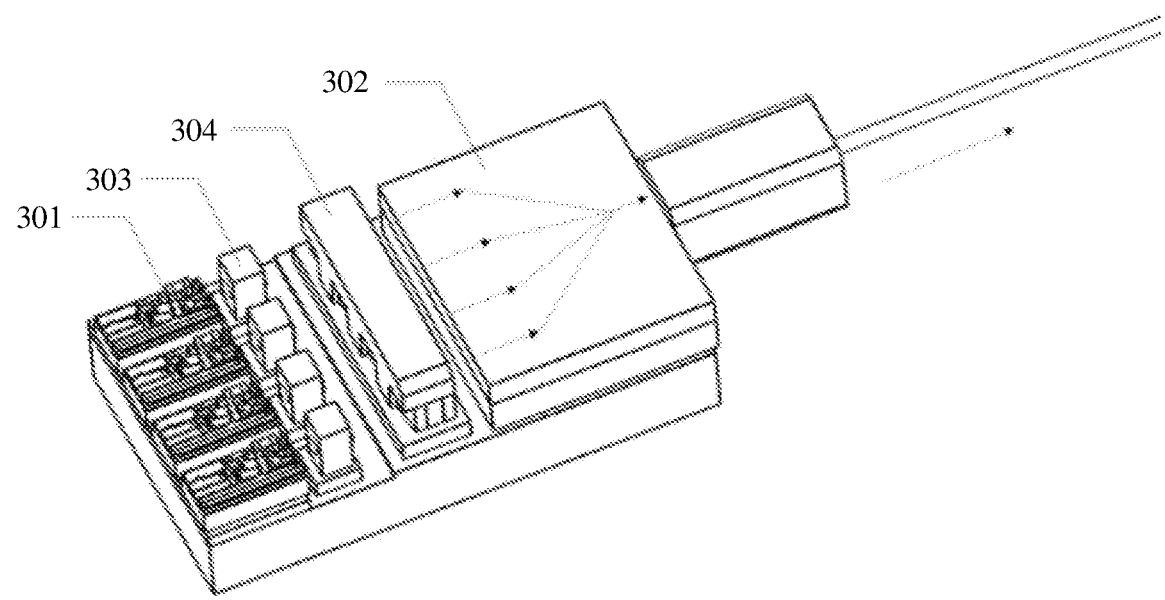
FIG. 4 is a schematic structural diagram of a transmitting unit of some embodiments of the present application.

FIG. 4 is a schematic structural diagram of the transmitting unit in some embodiments of the present application. As shown in FIG. 4, in some embodiments, the first transmitting unit 1021 comprises a laser chip 301, a planar optical waveguide multiplexing chip 302, a lens 303, and an isolator 304. The structure of the second transmitting unit 1023 is the same as that of the first transmitting unit 1021, and will not be repeated here.

Figure 5:
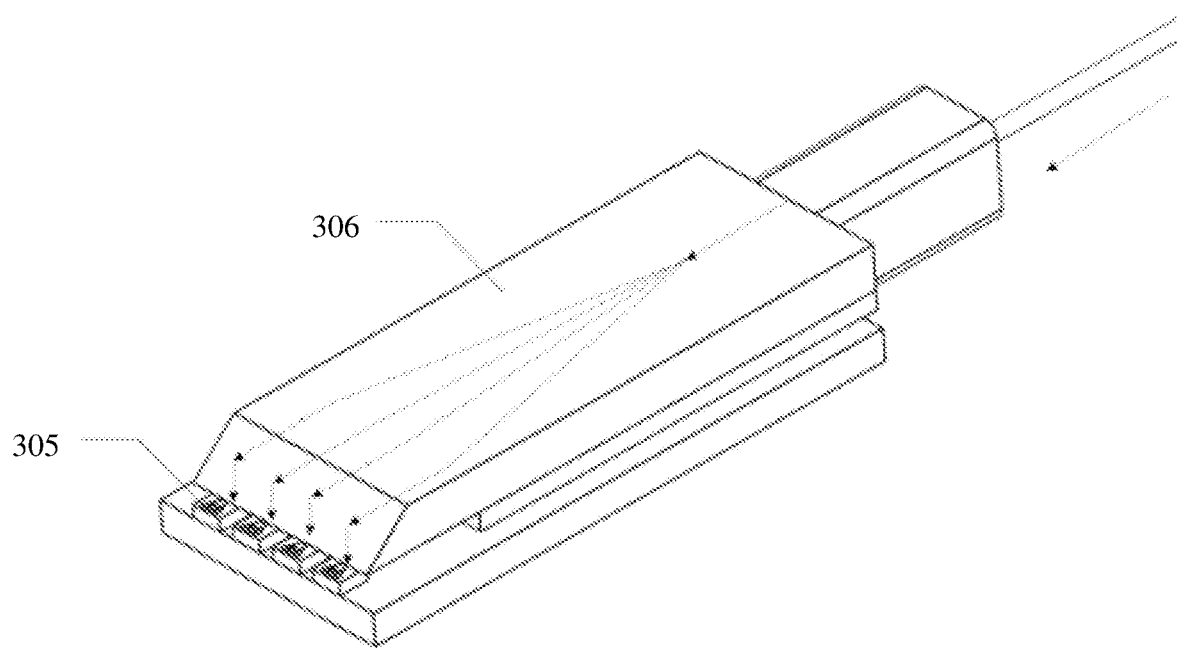
FIG. 5 is a schematic structural diagram of a receiving unit of some embodiments of the present application.

FIG. 5 is a schematic structural diagram of a receiving unit in some embodiments of the present application. As shown in FIG. 5, in some embodiments, the first receiving unit 1022 comprises a detector chip 305 and a planar optical waveguide demultiplexing chip 306. The structure of the second receiving unit 1024 is the same as that of the first receiving unit 1022, which will not be repeated here.

In some embodiments, the transmitting unit comprises 4 laser chips 301 with different wavelengths, the working wavelengths of which are respectively 1271 nm, 1291 nm, 1311 nm, and 1331 nm, collectively referred to as Coarse Wavelength Division Multiplexer (CWDM) 4 wavelengths.

The first transmitting unit 1021 comprises a four-path CWDM4-wavelength laser chip and a planar optical waveguide multiplexing chip, and the first receiving unit comprises a four-path detector chip and a planar optical waveguide demultiplexing chip.

If the working rate of transmitting/receiving each wavelength is 50 Gb/s, then the embodiments of the present application have 200 Gb/s transceiving ability. If the working rate of transmitting/receiving each wavelength is 100 Gb/s, then the embodiments of the present application have 400 Gb/s transceiving ability.

In the optical modules provided by some embodiments of the present application, as shown in FIGS. 2 and 3, the transmitting unit of each optical module comprises a four-path CWDM4-wavelength laser chip working at 50 Gb/s and a planar optical waveguide multiplexing chip, and the receiving unit comprises a four-path detector chip working at 50 Gb/s and a planar optical waveguide demultiplexing chip. The optical module shown in this embodiment has two 4×50 Gb/s transceiving capabilities, which solves the single-fiber bidirectional problem of the existing 2×200 G OSPF optical module.

An embodiment of the present application also provides an optical communication equipment comprising the optical module described in any of the foregoing embodiments.

Here, the structure of the optical communication equipment is not limited. For example, the optical communication equipment may be an optical switch, an optical transceiver, an optical fiber transceiver, a server, a remote radio unit, a baseband processing unit, an optical fiber repeater station, an optical fiber dry release station, etc.

An embodiment of the present application also provides an optical transmission system comprising any optical communication equipment described above. The structure of the optical transmission system is not limited here.

The technical solutions described in the embodiments of the present application can be combined arbitrarily as long as they are not in conflict with each other.

The above are only specific implementations of this application, but the protection scope of this application is not limited to this. Changes or substitutions which could be conceived of by a person skilled in the art can easily think will fall within the technical scope disclosed in this application. Therefore, the protection scope of this application should be subject to the protection scope of the claims.

What is claimed is:

1. An optical module, comprising:
a housing;
a main board;
first and second optical circulators; and
first and second optical fiber adapters;
wherein the housing is surrounded by a receiving cavity, and a first end of the housing is provided with first and second connecting cavities, the first optical fiber adapter being arranged at the first connecting cavity, the second optical fiber adapter being arranged at the second connecting cavity, the main board being at least partially arranged in the receiving cavity
and being provided with first and second transmitting units and first and second receiving units, an output end of the first transmitting unit being connected to a first port of the first optical circulator, an input end of the first receiving unit being connected to a third port of the first optical circulator, and a second port of the first optical circulator being connected to the first optical fiber adapter, an output end of the second transmitting unit being connected to a first port of the second optical circulator, an input end of the second receiving unit being connected to a third port of the second optical circulator, and a second port of the second optical circulator being connected to the second optical fiber adapter;
wherein an optical signal output by the output end of the first transmitting unit is transmitted along the first port of the first optical circulator to the second port of the first optical circulator;
wherein the first optical fiber adapter receives an optical signal input from outside, and transmits the optical signal received from outside to the third port of the first optical circulator along the second port of the first optical circulator;
wherein an optical signal output by the output end of the second transmitting unit is transmitted along the first port of the second optical circulator to the second port of the second optical circulator; and
wherein the second optical fiber adapter receives an optical signal input from outside, and transmits the optical signal received from outside by the second optical fiber adapter to the third port of the second optical circulator along the second port of the second optical circulator.

2. The optical module of claim 1, wherein the first port and the third port of the first optical circulator are located on a first side of the first optical circulator, and the second port of the first optical circulator is located on a second side of the first optical circulator.

3. The optical module of claim 2, wherein the first optical circulator is arranged on the main board.

4. The optical module of claim 1, wherein the first port and the third port of the second optical circulator are located on a first side of the second optical circulator, and the second port of the second optical circulator is located on a second side of the second optical circulator.

5. The optical module of claim 4, wherein the second optical circulator is arranged on the main board.

6. The optical module of claim 5, wherein
the first optical circulator, the second optical circulator, the first transmitting unit, and the second transmitting unit are located on one side of the main board;
the first receiving unit and the second receiving unit are located on the other side of the main board;
the first transmitting unit is located between the first optical circulator and the second optical circulator, close to the second optical circulator;
the first receiving unit is located close to the second optical circulator;
the second transmitting unit is located between the first optical circulator and the second optical circulator, close to the first optical circulator;
the second receiving unit is located close to the first optical circulator.

7. Optical communication equipment comprising an optical module which includes a housing, a main board, first and second optical circulators and first and second optical fiber adapters, wherein
the housing is surrounded by a receiving cavity, and wherein a first end of the housing is provided with first and second connecting cavities, the first and second optical fiber adapters being arranged at the first and second connecting cavities, respectively, the main board being at least partially arranged in the receiving cavity, the main board being provided with first and second transmitting units and first and second receiving units, an output end of the first transmitting unit being connected to a first port of the first optical circulator, an input end of the first receiving unit being connected to a third port of the first optical circulator, and a second port of the first optical circulator being connected to the first optical fiber adapter, an output end of the second transmitting unit being connected to a first port of the second optical circulator, an input end of the second receiving unit being connected to a third port of the second optical circulator, and a second port of the second optical circulator being connected to the second optical fiber adapter;
wherein an optical signal output by the output end of the first transmitting unit is transmitted along the first port of the first optical circulator to the second port of the first optical circulator;
wherein the first optical fiber adapter receives an optical signal input from outside, and transmits the optical signal received from outside to the third port of the first optical circulator along the second port of the first optical circulator;
wherein an optical signal output by the output end of the second transmitting unit is transmitted along the first port of the second optical circulator to the second port of the second optical circulator; and
wherein the second optical fiber adapter receives an optical signal input from outside, and transmits the optical signal received by the second optical fiber adapter from outside to the third port of the second optical circulator along the second port of the second optical circulator.

8. The optical communication equipment of claim 7, wherein the first port and the third port of the first optical circulator are located on a first side of the first optical circulator, and the second port of the first optical circulator is located on a second side of the first optical circulator.

9. The optical communication equipment of claim 8, wherein the first optical circulator is arranged on the main board.

10. The optical communication equipment of claim 7, wherein the first port and the third port of the second optical circulator are located on a first side of the second optical circulator, and the second port of the second optical circulator is located on a second side of the second optical circulator.

11. The optical communication equipment of claim 10, wherein the second optical circulator is arranged on the main board.

12. The optical communication equipment of claim 11, wherein
the first optical circulator, the second optical circulator, the first transmitting unit, and the second transmitting unit are located on one side of the main board;
the first receiving unit and the second receiving unit are located on the other side of the main board;
the first transmitting unit is located between the first optical circulator and the second optical circulator, close to the second optical circulator;
the first receiving unit is located close to the second optical circulator;
the second transmitting unit is located between the first optical circulator and the second optical circulator, close to the first optical circulator;
the second receiving unit is located close to the first optical circulator.

13. An optical transmission system comprising optical communication equipment which includes an optical module having a housing, a main board, first and second optical circulators and first and second optical fiber adapters, the housing being surrounded by a receiving cavity, and a first end of the housing being provided with first and second connecting cavities, the first and second optical fiber adapters being arranged at the first and second connecting cavities, respectively, the main board being at least partially arranged in the receiving cavity, the main board being provided with first and second transmitting units and first and second receiving units, an output end of the first transmitting unit being connected to a first port of the first optical circulator, an input end of the first receiving unit being connected to a third port of the first optical circulator, and a second port of the first optical circulator being connected to the first optical fiber adapter, an output end of the second transmitting unit being connected to a first port of the second optical circulator, an input end of the second receiving unit being connected to a third port of the second optical circulator, and a second port of the second optical circulator being connected to the second optical fiber adapter;
wherein an optical signal output by the output end of the first transmitting unit is transmitted along the first port of the first optical circulator to the second port of the first optical circulator;
wherein the first optical fiber adapter receives an optical signal input from outside, and transmits the optical signal received from outside to the third port of the first optical circulator along the second port of the first optical circulator;
wherein an optical signal output by the output end of the second transmitting unit is transmitted along the first port of the second optical circulator to the second port of the second optical circulator; and
wherein the second optical fiber adapter receives an optical signal input from outside, and transmits the optical signal received from outside by the second optical fiber adapter to the third port of the second optical circulator along the second port of the second optical circulator.

14. The optical transmission system of claiml 13, wherein the first port and the third port of the first optical circulator are located on a first side of the first optical circulator, and the second port of the first optical circulator is located on a second side of the first optical circulator.

15. The optical transmission system of claim 14, wherein the first optical circulator is arranged on the main board.

* * * * *